(12) United States Patent
Dickenscheid et al.

(10) Patent No.: US 7,644,702 B2
(45) Date of Patent: Jan. 12, 2010

(54) FUEL SUPPLY SYSTEM FOR A MOTOR VEHICLE

(75) Inventors: Lothar Dickenscheid, Ockenheim (DE); Dirk Möhring, Schwalbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/813,154

(22) PCT Filed: Nov. 18, 2005

(86) PCT No.: PCT/EP2005/056048

§ 371 (c)(1),
(2), (4) Date: Aug. 31, 2007

(87) PCT Pub. No.: WO2006/072503

PCT Pub. Date: Jul. 13, 2006

(65) Prior Publication Data

US 2008/0202470 A1  Aug. 28, 2008

(30) Foreign Application Priority Data

Jan. 4, 2005 (DE) .................. 10 2005 000 731

(51) Int. Cl.
*F02M 37/04* (2006.01)
*F02M 37/02* (2006.01)

(52) U.S. Cl. .................. 123/509; 137/565.22

(58) Field of Classification Search .............. 123/509, 123/446, 457, 511; 417/79, 87, 198; 137/565.01, 137/565.22, 565.29
See application file for complete search history.

(56) References Cited

U.S. PATENT DOCUMENTS

| | | | | |
|---|---|---|---|---|
| 3,645,094 A | * | 2/1972 | Suggs | 60/39.281 |
| 4,926,829 A | * | 5/1990 | Tuckey | 123/497 |
| 5,427,151 A | | 6/1995 | Pauley | 137/895 |
| 5,941,279 A | * | 8/1999 | Frank et al. | 137/574 |
| 6,273,131 B1 | * | 8/2001 | Kleppner | 137/565.22 |
| 6,341,623 B1 | | 1/2002 | Channing | 137/565.22 |
| 6,342,623 B1 | | 1/2002 | Chang et al. | 558/277 |
| 6,364,625 B1 | | 4/2002 | Sertier | 417/182 |
| 6,955,158 B2 | * | 10/2005 | Rumpf | 123/514 |

(Continued)

FOREIGN PATENT DOCUMENTS

DE          9101313 U1      6/1991

(Continued)

OTHER PUBLICATIONS

International Search Report PCT/EP2005/056048, 6 pages, Mar. 31, 2006.

(Continued)

*Primary Examiner*—Mahmoud Gimie
(74) *Attorney, Agent, or Firm*—King & Spalding L.L.P.

(57) ABSTRACT

A fuel supply system for a motor vehicle has a sucking jet pump (6, 7) which is connected to a flow line (5). The valve (16, 17) reduces the cross-section of an opening (20) in a nozzle (14, 15) of the sucking jet pump (6, 7) with increasing pressure in the flow line (5). Hydraulic losses in supplying the sucking jet pump (6, 7) with fuel as a pump fluid are prevented and the conveying performance of the sucking jet pump (6, 7) is maintained, preferably, at a constant level.

20 Claims, 1 Drawing Sheet

U.S. PATENT DOCUMENTS

| | | | |
|---|---|---|---|
| 2003/0118455 A1* | 6/2003 | Vilela et al. | 417/189 |
| 2003/0140872 A1* | 7/2003 | Fromont | 123/1 A |
| 2005/0051141 A1* | 3/2005 | Rumpf | 123/514 |
| 2005/0178367 A1* | 8/2005 | Wolters et al. | 123/514 |
| 2006/0251935 A1* | 11/2006 | Barrett et al. | 429/22 |
| 2007/0151609 A1 | 7/2007 | Dickenscheid | 137/565.22 |

FOREIGN PATENT DOCUMENTS

| | | |
|---|---|---|
| DE | 4201037 A1 | 7/1993 |
| DE | 10136399 A1 | 3/2002 |
| DE | 69814654 T2 | 4/2004 |
| DE | 102004003114 A1 | 8/2005 |
| JP | 60069300 A | 4/1985 |

OTHER PUBLICATIONS

Written Opinion of International Search Report PCT/EP2005/056048, 5 pages, Mar. 31, 2006.

\* cited by examiner

FUEL SUPPLY SYSTEM FOR A MOTOR VEHICLE

CROSS-REFERENCE TO RELATED APPLICATIONS

This application is a U.S. national stage application of International Application No. PCT/EP2005/056048 filed Nov. 18, 2005, which designates the United States of America, and claims priority to German application number 10 2005 000 731.7 filed Jan. 4, 2005, the contents of which are hereby incorporated by reference in their entirety.

TECHNICAL FIELD

The invention relates to a fuel supply system for a motor vehicle having a fuel pump which is designed to deliver fuel via a feed line to an internal combustion engine of the motor vehicle, having a suction jet pump for delivering fuel, and having a valve for controlling the capacity of the suction jet pump.

BACKGROUND

Fuel supply systems of said type are often used in modern-day motor vehicles and are known from practice. The suction jet pump is arranged in a return line leading from the internal combustion engine into the fuel tank or is supplied by the fuel pump with fuel as a propellant. The valve of the known fuel supply system ensures that the suction jet pump has a sufficient delivery capacity even in the case of a low propulsion quantity of fuel. Since the propulsion pressure of fuel can be subject to intense fluctuations, the valve is preloaded by a spring force into a closed position. With increasing pressure, the valve is opened and the suction jet pump obtains fuel as propellant. With increasing pressure, the opening of the valve increases, as a result of which the delivery capacity of the suction jet pump increases.

A disadvantage of the known fuel supply system is that, in the case of a variable propulsion pressure, the delivery capacity of the suction jet pump varies. At a high propulsion pressure, the propulsion quantity is therefore too high. This however results in a loss of hydraulic power.

SUMMARY

According to an embodiment, a fuel supply system for a motor vehicle having a fuel pump which is designed to deliver fuel via a feed line to an internal combustion engine of the motor vehicle, comprising a suction jet pump for delivering fuel, and a valve for controlling a capacity of the suction jet pump, wherein the valve is designed to reduce, with rising propulsion pressure, the size of an opening which is designed to supply the suction jet pump with fuel as a propellant. Such a suction jet pump has a constant delivery capacity largely independently of the propulsion pressure.

BRIEF DESCRIPTION OF THE DRAWINGS

The invention permits numerous embodiments. Two of these are described below in order to further clarify its basic principle. In the figures.

DETAILED DESCRIPTION

Figure 1:
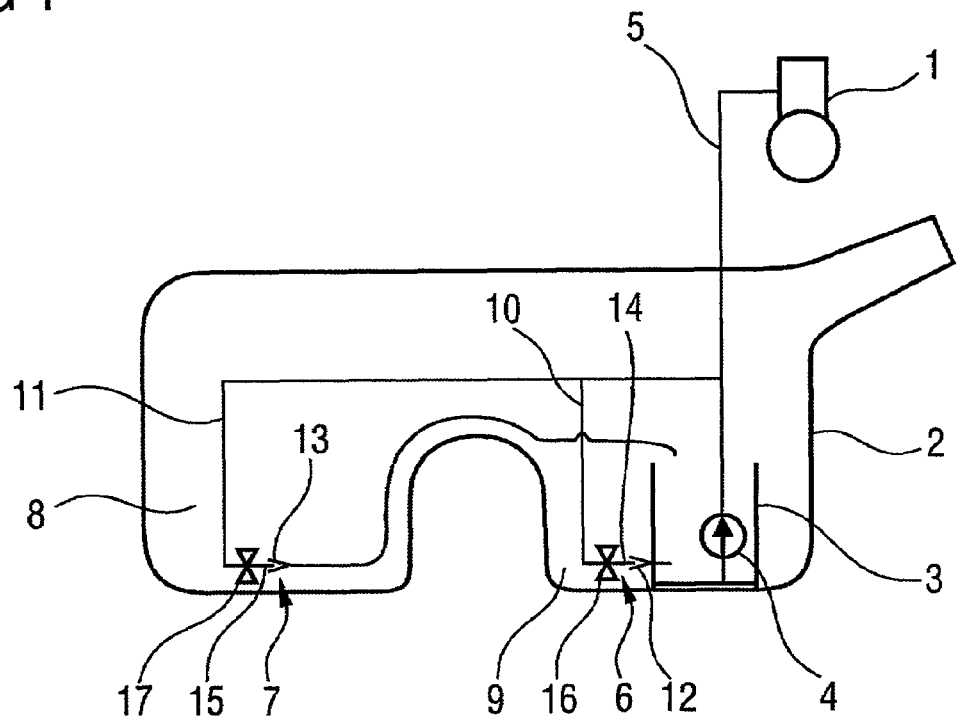
FIG. 1 shows a fuel supply system according to an embodiment for a motor vehicle.

As a result of said design, it is possible to design the suction jet pump for a minimum propulsion pressure and a minimum propulsion quantity. With rising propulsion pressure, the opening of the valve is reduced in size, and therefore a loss of hydraulic power as a result of excessive delivery of fuel to the suction jet pump is avoided. As a result, the propulsion quantity falls with rising propulsion pressure. In the case in particular of internal combustion engines which operate on the Otto principle, it has proven to be advantageous if a nozzle of the suction jet pump is connected to the feed line. It is possible in this way for the fuel pump to also be controlled according to the fuel demand of the internal combustion engine, and to ensure that none of the hydraulic power generated by the fuel pump is lost.

The fuel supply system according to various embodiments is of particularly simple structural design if the valve and the nozzle of the suction jet pump are designed as a structural unit. A further advantage of this configuration is that the suction jet pump and the valve require a particularly small amount of installation space.

According to another embodiment, it is possible in a simple manner to ensure a sufficiently powerful propellant jet when the valve is partially closed if a valve body of the valve projects into the opening of the nozzle of the suction jet pump. As a result of said configuration, the opening of the valve is at the same time the opening of the nozzle of the suction jet pump.

The control of the cross section of the nozzle of the suction jet pump requires particularly little structural expenditure if a valve body is guided so as to be axially moveable and has a narrowing section and projects with the narrowing section into the opening of the nozzle of the suction jet pump. As a result of said configuration, the valve body is acted on with the pressure generated by the feed line and the lower, ambient pressure situated downstream of the nozzle. The position of the valve body and therefore of the narrowing section is thereby adjusted, which results in the setting of a corresponding cross section of the nozzle of the suction jet pump. In the simplest case, the narrowing section is of conical design.

According to another embodiment, in the case of a low propulsion pressure shortly after the start of the fuel pump, the suction jet pump obtains a sufficient quantity of fuel as propellant if the valve has a spring element which preloads the valve body into a basic position in which the opening is at its largest. As a result of said configuration, the spring element preloads the valve body counter to the flow direction of the fuel.

According to another embodiment, the axially moveable guidance of the valve body requires a particularly low structural expenditure if the valve body is connected to a guide section, and if the guide section is guided in a tubular section of the valve and supports the narrowing section.

According to another embodiment, a turbulence-inducing flow deflection of the valve can be simply avoided if the tubular section directly adjoins a branch which is connected to the feed line.

According to another embodiment, the valve and the suction jet pump are of particularly compact configuration if the spring element is supported on a housing part, which has the opening of the nozzle, and on the guide section.

The structural unit composed of the valve and nozzle of the suction jet pump can be produced particularly cost-effectively if the narrowing section of the valve body and the opening of the nozzle of the suction jet pump are in each case round. In this way, the flow cross section of the nozzle of the suction jet pump is of annular configuration in every position of the valve body.

According to another embodiment, a contribution to a further reduction of the turbulence in the region of the suction jet pump and of the valve is provided if the narrowing section of the valve body has at least one duct. As a result of said configuration, the nozzle of the suction jet pump can generate one or more sufficiently intense propellant jets in every position of the valve body. In the simplest case, the duct is formed by a flattened portion on the valve body. The narrowing is preferably formed here by the duct. Here, the valve body can be cylindrical.

According to another embodiment, a contribution to a reduction of the energy consumption of the fuel pump is provided if the output capacity of the fuel pump can be regulated according to the fuel demand of the internal combustion engine. In fuel supply systems of said type, a low electrical voltage is applied to the fuel pump if only a small quantity of fuel is to be delivered to the internal combustion engine. If the fuel demand of the internal combustion engine rises, then the voltage applied to the fuel pump is increased. Here, the valve ensures that the suction jet pump obtains a sufficient quantity of fuel as propellant.

In the event of a brief high fuel demand of the internal combustion engine, it is possible for the entire amount of fuel delivered by the fuel pump to be delivered to the internal combustion engine if the valve body completely closes the opening at a designated high pressure in the feed line.

FIG. 1 shows a fuel supply system for supplying an internal combustion engine 1 of a motor vehicle with fuel from a fuel tank 2. The fuel supply system has a surge pot 3 arranged within the fuel tank 2 and a fuel pump 4 which delivers fuel from the surge pot 3 via a feed line 5 to the internal combustion engine 1. The capacity of the fuel pump 4 is controlled as a function of the fuel demand of the internal combustion engine 1. Furthermore, the fuel supply system has two suction jet pumps 6, 7, one of which delivers fuel from a chamber 8 of the fuel tank 2 into the surge pot 3. The other suction jet pump 6 delivers fuel from the chamber 9 into the surge pot 3. The suction jet pumps 6, 7 are in each case supplied with fuel as propellant via a branch 10, 11 which leads away from the feed line 5, and have in each case one nozzle 14, 15 arranged upstream of a mixing tube 12, 13. Furthermore, in each case one valve 16, 17 is arranged in the branches 10, 11. The valves 16, 17 serve to regulate the volume flow rate of fuel which the suction jet pumps 6, 7 obtain.

Figure 2:
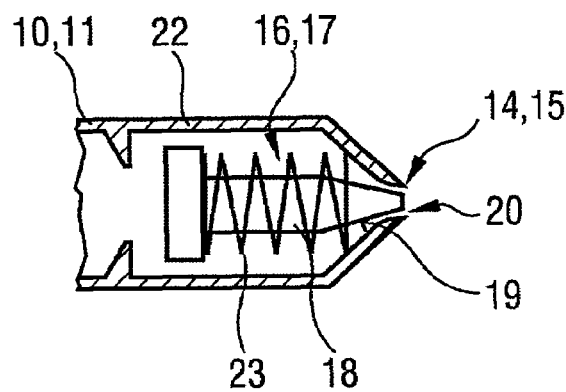
FIG. 2 is a greatly enlarged sectioned illustration of a nozzle of a suction jet pump of the fuel supply system from FIG. 1.

FIG. 2 is a greatly enlarged sectioned illustration through a structural unit of the valves 16, 17 and of the nozzles 14, 15 of the suction jet pumps 6, 7 from FIG. 1. The structural units are of identical construction. It can be seen here that a valve body 18 of the valve 16, 17 has a narrowing section 19 with which it projects into an opening 20 of the nozzle 14, 15 of the suction jet pump 6, 7. The narrowing section 19 is of conical design and is connected to a guide section 21. The valve body 18 is guided so as to be axially moveable in a tubular section 22 which adjoins the branch 10, 11 which leads away from the feed line 5 from FIG. 1. A spring element 23 preloads the valve body 18 counter in the flow direction in the tubular section 22. With increasing pressure in the section 10, 11 which branches off from the feed line 5 in FIG. 1, the valve body 18 is moved counter to the force of the spring element 23 and reduces the flow cross section of the opening 20 of the nozzle 14, 15.

Figure 3:
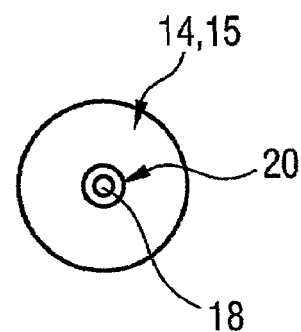
FIG. 3 shows a side view of the nozzle of the suction jet pump from FIG. 2.

The valve 16, 17 is illustrated in a central position in which the narrowing section 19 projects into the opening 20 of the nozzle 14, 15. In this way, the flow cross section of the opening 20 is of annular design, as can be clearly seen in FIG. 3 in a side view of the nozzle 14, 15. In order to completely close off the opening 20, the valve body 18 can additionally have a bead (not illustrated).

Figure 4:
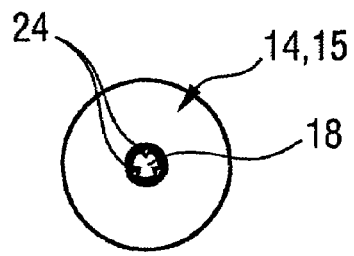
FIG. 4 shows a side view of a further embodiment of the nozzle of the suction jet pump from FIG. 2.

FIG. 4 shows a further embodiment of the nozzle 14, 15 of the suction jet pumps 6, 7 from FIG. 1 in a side view, in which the valve body 18 of the valve 16, 17 has ducts 24. In this way, the nozzle 14, 15 of the suction jet pump 6, 7 generates individual propellant jets.

What is claimed is:

1. A fuel supply system for a motor vehicle having a fuel pump which is designed to deliver fuel via a feed line to an internal combustion engine of the motor vehicle, comprising a suction jet pump for delivering fuel, and a valve for controlling a capacity of the suction jet pump, wherein the valve includes a valve body configured such that rising propulsion pressure acting on the valve body directly moves the valve body, the movement of the valve body physically reducing a cross-sectional area of an opening designed to supply the suction jet pump with fuel as a propellant.

2. The fuel supply system as claimed in claim 1, wherein a nozzle of the suction jet pump is connected to the feed line.

3. The fuel supply system as claimed in claim 2, wherein the valve and the nozzle of the suction jet pump are designed as a structural unit.

4. The fuel supply system as claimed in claim 1, wherein the valve body of the valve projects into the opening of the nozzle of the suction jet pump.

5. The fuel supply system as claimed in claim 1, wherein the valve body is guided so as to be axially moveable and has a narrowing section and projects with the narrowing section into the opening of the nozzle of the suction jet pump.

6. The fuel supply system as claimed in claim 1, wherein the valve has a spring element which preloads the valve body into a basic position in which the opening is at its largest.

7. The fuel supply system as claimed in claim 1, wherein the valve body is connected to a guide section, and wherein the guide section is guided in a tubular section of the valve and supports the narrowing section.

8. The fuel supply system as claimed in claim 1, wherein the tubular section directly adjoins a branch which is connected to the feed line.

9. The fuel supply system as claimed in claim 1, wherein the spring element is supported on a housing part, which has the opening of the nozzle, and on the guide section.

10. The fuel supply system as claimed in claim 1, wherein the narrowing section of the valve body and the opening of the nozzle of the suction jet pump are in each case round.

11. The fuel supply system as claimed in claim 1, wherein the narrowing section of the valve body has at least one duct.

12. The fuel supply system as claimed in claim 1, wherein the output capacity of the fuel pump can be regulated according to the fuel demand of the internal combustion engine.

13. The fuel supply system as claimed in claim 1, wherein the valve body completely closes the opening at a designated high pressure in the feed line.

14. A fuel pump comprising a suction jet pump for delivering fuel, and a valve for controlling a capacity of a suction jet pump, wherein the valve includes a valve body and an opening for supplying the suction jet pump with fuel as a propellant, wherein a cross-sectional area of the opening is reduced with rising propulsion pressure due to movement of a valve body relative to the opening, wherein the force of the rising propulsion pressure acting on the valve body physically moves the valve body.

15. The fuel pump as claimed in claim 14, wherein a nozzle of the suction jet pump is connected to a feed line.

16. The fuel pump as claimed in claim 15, wherein the valve and the nozzle of the suction jet pump are designed as a structural unit.

17. The fuel pump as claimed in claim 14, wherein the valve body of the valve projects into the opening of the nozzle of the suction jet pump.

18. The fuel pump as claimed in claim 14, wherein the valve body is guided so as to be axially moveable and has a narrowing section and projects with the narrowing section into the opening of the nozzle of the suction jet pump.

19. The fuel pump as claimed in claim 14, wherein the valve has a spring element which preloads the valve body into a basic position in which the opening is at its largest.

20. A fuel supply system for a motor vehicle having a fuel pump which is designed to deliver fuel via a feed line to an internal combustion engine of the motor vehicle, comprising a suction jet pump for delivering fuel, and a valve for controlling a capacity of the suction jet pump, wherein a nozzle of the suction jet pump is connected to the feed line, the valve and the nozzle of the suction jet pump are designed as a structural unit, wherein a valve body of the valve projects into an opening of the nozzle of the suction jet pump, and wherein the force of rising propulsion pressure acting on the valve body physically moves the valve body relative to the nozzle to reduce a cross-sectional area of the opening of the nozzle.

* * * * *